United States Patent
Dutton (10) Patent No.: US 6,340,106 B1
(45) Date of Patent: Jan. 22, 2002

(54) CARRYING RACK FOR TRUCK BEDS

(76) Inventor: Jason D. Dutton, 2154 Pinebrook Trail, Cuyahoga FAlls, OH (US) 44223

( * ) Notice: Subject to any disclaimer, the term of this patent is extended or adjusted under 35 U.S.C. 154(b) by 0 days.

(21) Appl. No.: 09/528,323

(22) Filed: Mar. 20, 2000

Related U.S. Application Data (63) Continuation-in-part of application No. 09/190,879, filed on Nov. 12, 1998, now abandoned.

(51) Int. Cl.$^7$ .................................................. B60R 9/00
(52) U.S. Cl. ....................... 224/405; 224/319; 224/402; 224/403; 224/924; 296/37.6
(58) Field of Search ................................ 224/405, 402, 224/403, 319, 924; 296/37.6, 100

(56) References Cited

U.S. PATENT DOCUMENTS

| | | |
|---|---|---|
| 3,912,139 A | 10/1975 | Bowman |
| 5,092,504 A | 3/1992 | Hannes et al. |
| 5,127,564 A | 7/1992 | Romero |
| 5,139,375 A | 8/1992 | Franchuk |
| 5,143,415 A | 9/1992 | Boudah |
| 5,261,719 A | 11/1993 | Tucker |
| 5,303,858 A | 4/1994 | Price |
| 5,314,104 A | 5/1994 | Lee |
| 5,366,128 A | 11/1994 | Grim |
| 5,393,114 A | 2/1995 | Christensen |
| 5,494,327 A | 2/1996 | Derecktor |
| 5,516,020 A | 5/1996 | Lawler et al. |
| 5,553,762 A | 9/1996 | Brown |
| 5,564,773 A | 10/1996 | Lapsley et al. |
| 5,584,521 A | 12/1996 | Hathaway et al. |
| 5,611,472 A * | 3/1997 | Miller .......................... 224/403 |
| 5,641,108 A | 6/1997 | Ewer |
| 5,741,038 A | 4/1998 | Fowler et al. |
| 5,827,023 A | 10/1998 | Stull |
| 5,921,603 A | 7/1999 | Karrer |
| 6,059,159 A * | 5/2000 | Fisher .......................... 224/403 |
| 6,179,181 B1 * | 1/2001 | Johnson et al. .............. 224/405 |

FOREIGN PATENT DOCUMENTS

EP   0086318 A1   8/1983

OTHER PUBLICATIONS

"Performance" bicycle catalog—"1998 Fall Preview Sale" p. 63, Figure C "Performance XPORT Deluxe Truck Rack"—Item C.

* cited by examiner

Primary Examiner—Stephen K. Cronin
Assistant Examiner—Maerena W. Brevard
(74) Attorney, Agent, or Firm—Hahn Loeser & Parks LLP; Alexander D. Bommarito

(57) ABSTRACT

The present invention provides a carrying rack for transporting sporting or work equipment over a truck bed. The carrying rack utilizes the space above the truck bed so the truck bed may be enclosed with a tonneau or hard shell cover. The carrying rack is mounted to the truck bed so the cover may be removed or raised without removing the entire carrying rack. The carrying rack includes removable cross members that are attached when in use. The removable cross members include mounts for attaching equipment such as bicycles, skis, kayaks, ladders, or other types of equipment. The carrying rack allows the truck bed space to be used for other purposes while transporting sporting or other equipment.

16 Claims, 15 Drawing Sheets

CARRYING RACK FOR TRUCK BEDS

This is a continuation-in-part of application Ser. No. 09/190,879, filed Nov. 12, 1998, now abandoned.

FIELD OF THE INVENTION

The present invention relates generally to vehicle racks and more particularly to a carrying rack for transporting bicycles, sporting or work equipment.

BACKGROUND OF THE INVENTION

Many different designs of carrying racks exist in the prior art. Some are intended only for use within pickup truck beds. Others are mounted to a truck's trailer hitch. Some carrying rack styles are roof oriented for both space efficiency and compatibility with many vehicle types. Despite the variety of carrying racks in the prior art, none allow for the quick and easy use of a tonneau or hard shell bed cover and the cargo bed itself, while providing for the attachment of bicycles or other equipment for transport.

One common bicycle and equipment rack is the roof mounted rack. A typical roof mounted rack consists of side beams mounted in parallel with the direction of the car or truck. Cross beams with attached mounts are placed perpendicular to the side beams. There are a limited number of these racks that will fit a pickup truck roof. Further, when a roof-mounted rack is installed on a truck, it is difficult to reach the rack to load bicycles and/or other equipment due to the added height of most pickup trucks. In the same regard, the height of the bicycles or other equipment, combined with the height of the truck is unsafe to users. There is also concern for securing bicycles at this height because of the possibility of contacting low bridges, trees, and having the bicycles dismount from the rack due to being mounted so far from the truck's center of gravity. Moreover, on rough roads, bicycles in this location will suffer exaggerated effects from bumps.

Another common style of bicycle and equipment rack is the hitch-mounted rack. This rack is especially suitable for pickup trucks because many trucks have hitches. Hitch-mounted racks are advantageous because they are out of the way and do not use precious truck bed space. They are also easily loaded and unloaded. However, because of the value of some bicycles and other sporting equipment it is preferable not to have this equipment located close to the road, where stones are likely to damage the equipment. This is also a vulnerable location due to the chance of accidents with other vehicles. A rear-end collision, even a minor one, would mean minimal damage to the bumper and car, but any bicycle or equipment caught in between two cars would be crushed.

A further type of bicycle or equipment rack for use with a pickup truck is the in-bed rack. These racks typically consist of a fork mount on the floor of the truck bed, or an arm from one side of the bed to the other, attached to the upper rim of the walls of the truck bed. Although these racks are effective, they still do not resolve all the concerns of truck owners. As trucks have become more popular, so too has the use of bed covers. The soft tonneau or hard shell cover, needs to be removed from the bed in order to use in-bed racks. The in-bed style of bicycle and equipment rack also takes up valuable bed space. Truck owners typically want to use the truck bed for storing items in addition to bicycles and equipment.

SUMMARY OF THE PRESENT INVENTION

The bicycle rack of the present invention is comprised of two base members that are attached to the walls of the truck bed. The base members extend outward from the walls of the truck bed and are attached to one or more cross members. The cross members can be removed for storage in the truck bed when not in use. The cross members mount easily to the base members. The cross members are intended to be removable because many tonneau and hard shell covers are hinged and can be raised like a trunk lid for a car. When the cross members are removed, the bed cover is free to move in an upward direction.

The present invention allows for easy transportation of bicycles and other equipment on a truck, while not taking up valuable bed space or sacrificing the bed cover. The present invention takes advantage of the space above the bed and makes it unnecessary to remove a tonneau or hard shell cover each time bicycles or equipment is transported. The present invention also protects bicycles and other equipment from damage normally associated with being carried on the hitch, where such equipment is subject to the risk of fender-bender accidents that would crush the equipment. The present invention further provides bicycles and equipment with a lower center of gravity than most car roof racks.

BRIEF DESCRIPTION OF THE DRAWINGS

FIG. 2a is a perspective view of a base member of the carrying rack of the present invention; FIG. 2b is a second perspective view of a base member as shown in FIG. 2a;

FIG. 8b is a front elevational view of the hand-tightened nut of FIG. 8a; FIG. 8c is a front elevational view in cross section of the hand-tightened nut of FIG. 8a;

FIG. 10b is a rear elevational view of the cross member of FIG. 10a; FIG. 10c is bottom view of the cross member of FIG. 10a; FIG. 10d is a perspective view of the cross member of FIG. 10a;

FIG. 11c is a bottom view of the cross member of FIG. 11a; FIG. 11d is a perspective view of the cross member of FIG. 11a;

FIG. 12b is a rear view of the equipment mount and cross member of FIG. 12a; FIG. 12c is a bottom view of the equipment mount and cross member of FIG. 12a; FIG. 12d is a perspective view of the equipment mount and cross member of FIG. 12a;

FIG. 13b is a rear view of the bicycle wheel mount and cross member of FIG. 13a; FIG. 13c is a bottom view of the bicycle wheel mount and cross member of FIG. 13a;

DETAIL DESCRIPTION OF THE PREFERRED EMBODIMENT

Reference will now be made in detail to the preferred embodiments of the present invention, examples of which are illustrated in the accompanying drawings. Whenever possible, the same reference numbers are used throughout the drawings to refer to the same or like parts.

Figure 1:
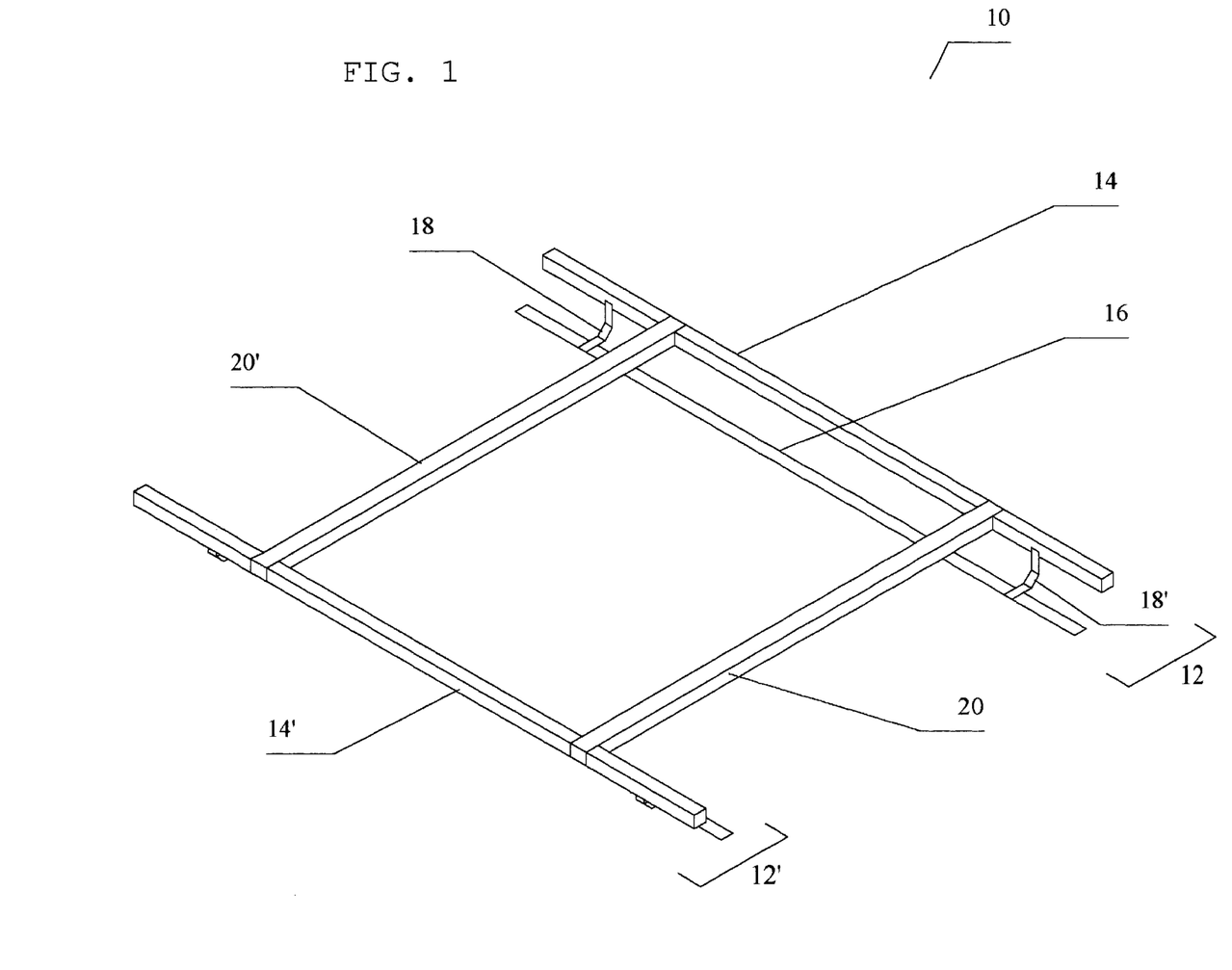
FIG. 1 is a perspective view of the carrying rack of the present invention.

FIG. 1 shows the carrying rack of the present invention 10 comprised of two base members 12 and 12' and two cross members 20 and 20' attached to each of the base members.

Figures 2A, 2B:
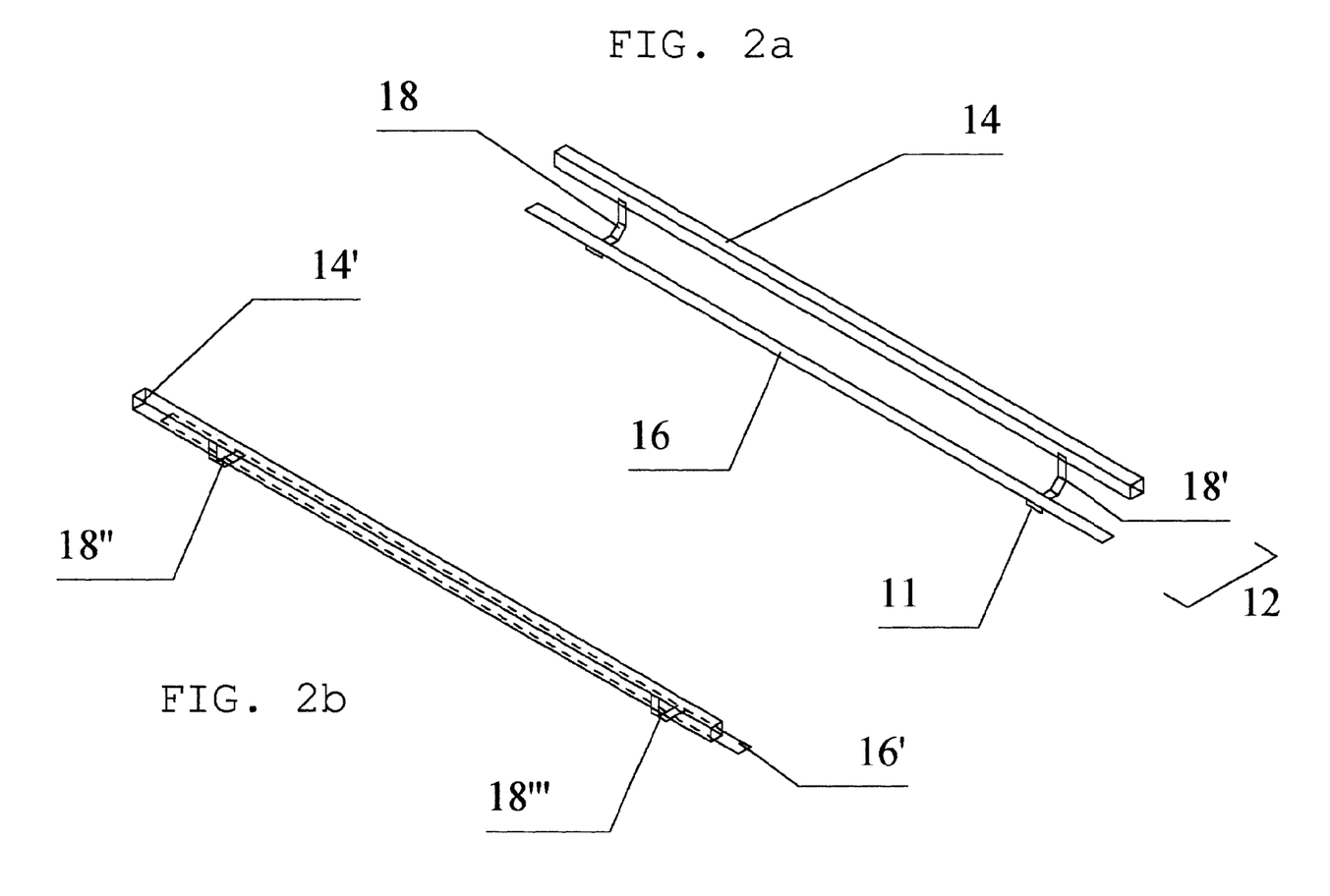
Figure 3:
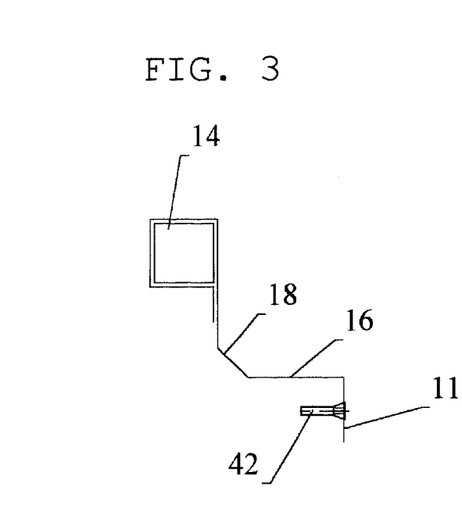
FIG. 3 is a rear elevational view of a base member including attachment hardware.
Figure 4:
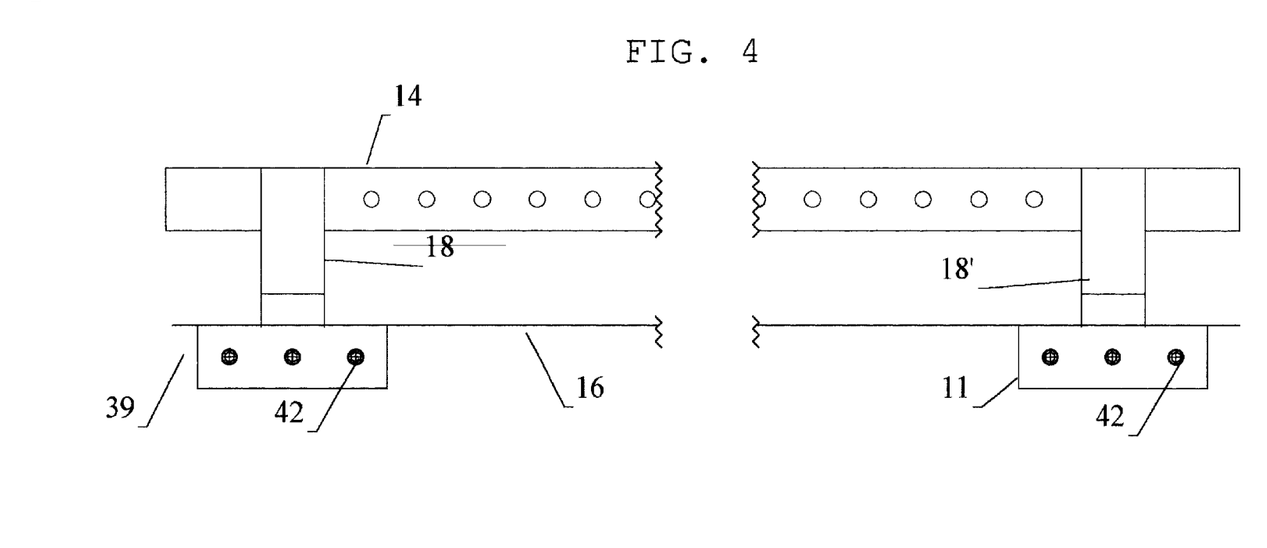
FIG. 4 is a side elevational view of the base member of FIG. 3 attached to a track bed.
Figure 5:
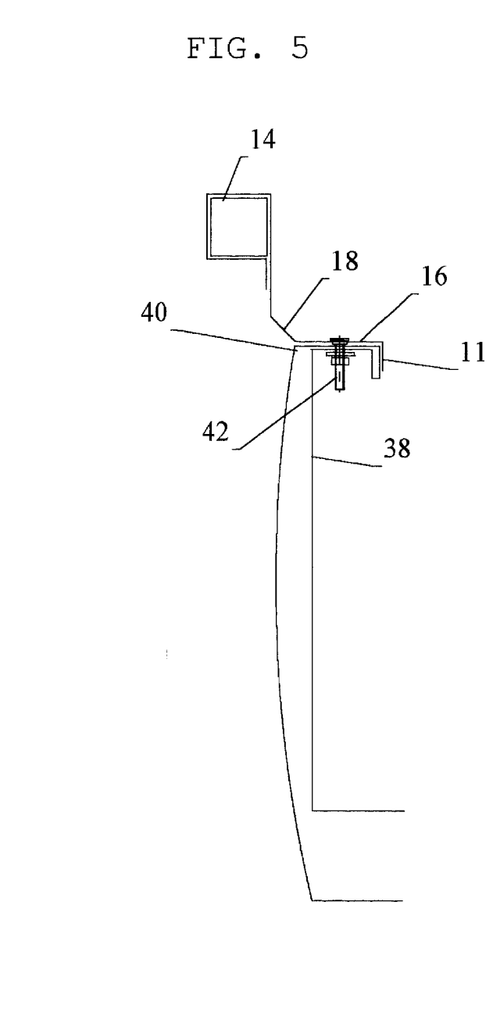
FIG. 5 is a rear elevational view of an alternate embodiment of a base member including attachment hardware.
Figure 6:
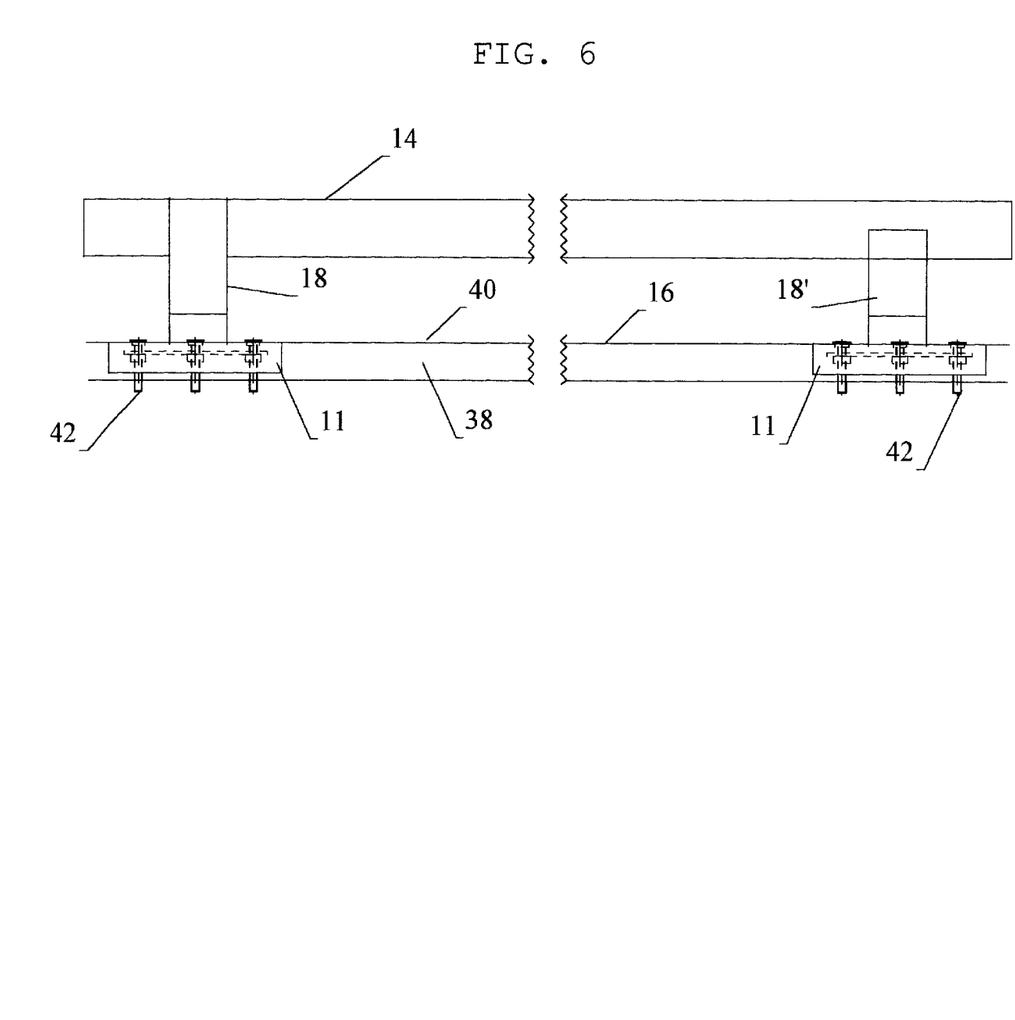
FIG. 6 is a side elevational view of the base member of FIG. 5 attached to a truck bed.
Figure 7:
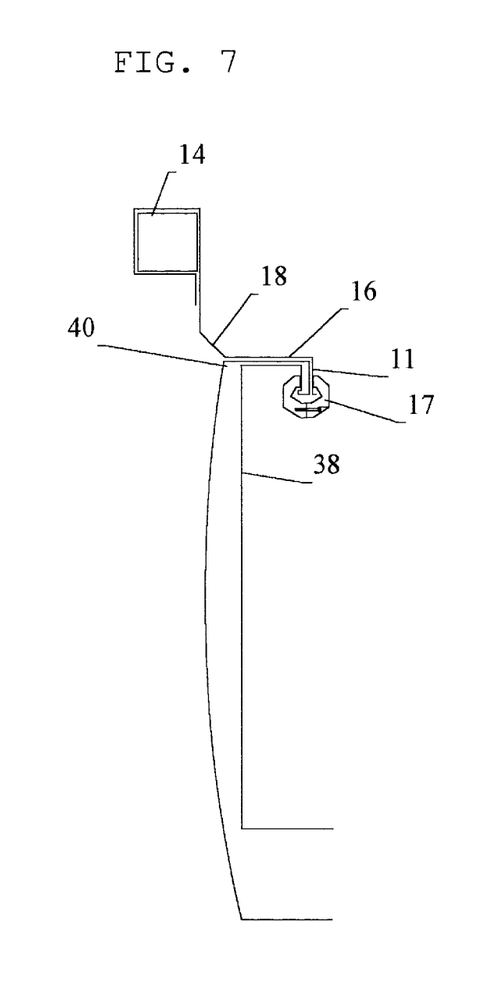
FIG. 7 is a rear elevational view of the base member attached to the truck bed by clamps.

As shown in FIG. 2, each base member 12, 12' is made up of a mounting member 11, a bed lip sealing member 16, extension arms 18 and 18', and a longitudinal arm 14. Each base member 12, 12' of the carrying rack 10, can be attached to the pickup truck bed 38, by various means. As shown in FIGS. 3 through 6 the base member 12 may be fastened to the truck bed 38 through means of fasteners and attaching hardware. As shown in FIGS. 3 and 4, base member 12 is attached with fasteners to the inside lip 39 of the truck bed 38. In FIGS. 5 and 6, base member 12 is fastened to the upper lip 40 of the pickup truck bed 38. Alternatively, as shown in FIG. 7, base members 12, 12' may be affixed to the pickup truck bed 38 by means of clamps. Use of clamps allows for quicker and easier attachment and removal of each of the base members 12, 12' of the rack of the present invention.

As shown in FIGS. 1 through 6, bed lip sealing member 16 is positioned adjacent to the mounting member 11 of base member 12. Bed-lip sealing member 16 provides a flush surface along the length of the upper lip 40 of truck bed 38, allowing a bed cover 34 to be placed securely, with no gaps, over the truck bed 38. Bed lip sealing member 16 is affixed to mounting member 11 of base member 12 and thereby functions as a structural supporting member.

As is also shown in FIGS. 1 through 6, affixed to the bed lip sealing member 16 are extension arms 18 and 18'. Extension arms 18 and 18' extend outward from truck bed 38 and above the height of truck bed 38. Extension arms 18 and 18' provide support for longitudinal arms 14, 14', outward and above from upper lip 40 of truck bed 38 and allow for installation of a bed cover over the open portion of the bed. Although two extension arms 18, 18' are shown and described, additional extension arms may be included as necessary to support the equipment or cargo desired to be transported. Furthermore, extension arms 18 and 18' may be formed in a number of shapes. As shown in the accompanying drawings, extension arms 18 and 18' are shown in the preferred embodiment with an acute angle formed along extension arms 18 and 18' between bed lip sealing member 16 and longitudinal arm 14. However, extension arms 18 and 18' could be formed with a 90 degree angle, a U-shape, or a variety of other configurations to accommodate different styles of truck bed covers.

Attached to extension arms 18 and 18' is longitudinal arm 14. Longitudinal arm 14, is a rail that extends parallel to the truck bed and along its entire length in the preferred embodiment. Longitudinal arms 14 and 14' are provided with regularly spaced apertures along their length to allow for securing cross members 20 and 20' at various locations. Longitudinal arms 14, 14' support the weight of both cross members 20 and 20' and the associated bicycle or other equipment to be secured to and transported upon the rack 10 of the present invention.

Figure 8A:
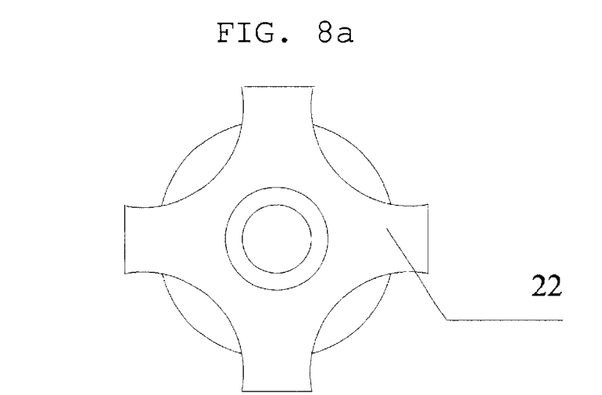
FIG. 8a is a top plan view of a hand-tightened nut for use in the present invention.
Figure 8B:
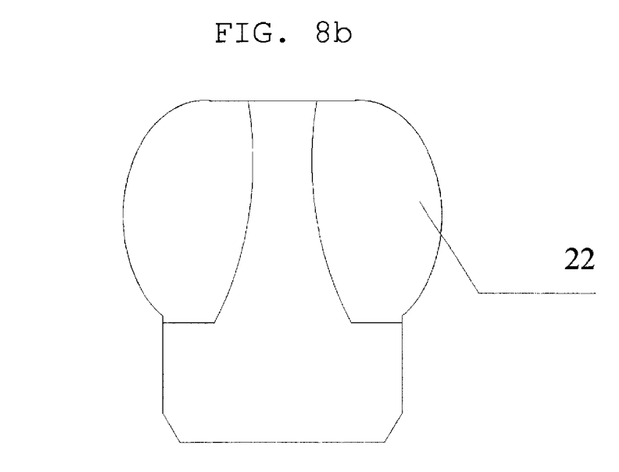
Figure 8C:
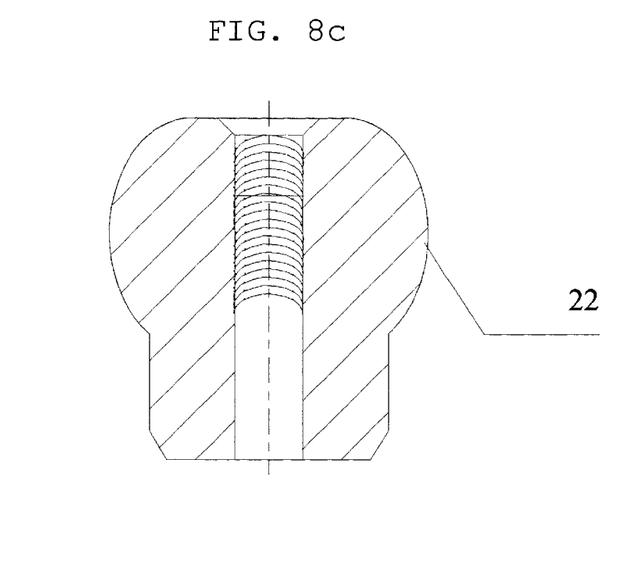

Selectively attached to each longitudinal arm 14, 14' are cross members 20 and 20', as shown in FIGS. 8a through 10d. Cross members 20 and 20' are attached to each longitudinal arm 14, 14' by fasteners. In the preferred embodiment, cross members 20 and 20' are attached to each longitudinal arm 14, 14' by way of a fastener comprising a retaining bolt 23 and a hand-tightened nut 22 (as shown in FIGS. 8a through 8c) positioned through an attachment bracket 24 or flange 26 attached to the ends of each cross member 20 and 20', respectively. Affixing cross members 20 and 20' to each longitudinal arm 14 in this manner allows for easy attachment and removal of cross members 20 and 20'. Cross members 20 and 20' can be positioned at various locations along longitudinal arms 14, 14' to allow for support of equipment of different sizes and weights. Further, cross members 20 and 20' can be manufactured to be extendable to accommodate truck beds of different widths. Each cross member 20 and 20' is provided with apertures spaced along its length to provide for attachment of various equipment mounts. If necessary to provide adequate support for the equipment to be transported, additional cross members 20, 20' can be used as herein before described.

Figure 9A:
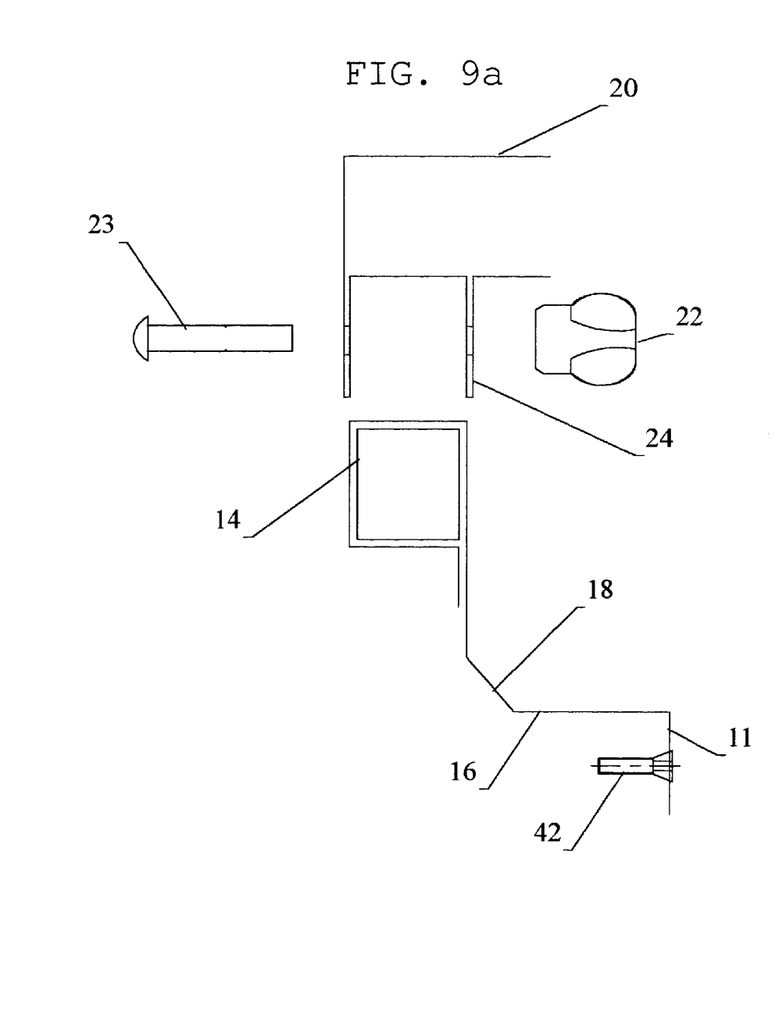
FIG. 9a is a rear elevational view of the base member of FIG. 3, a cross member having a bracket for attaching to the base member and a retaining bolt and hand-tightened nut for securing the cross member to the base member.
Figure 9B:
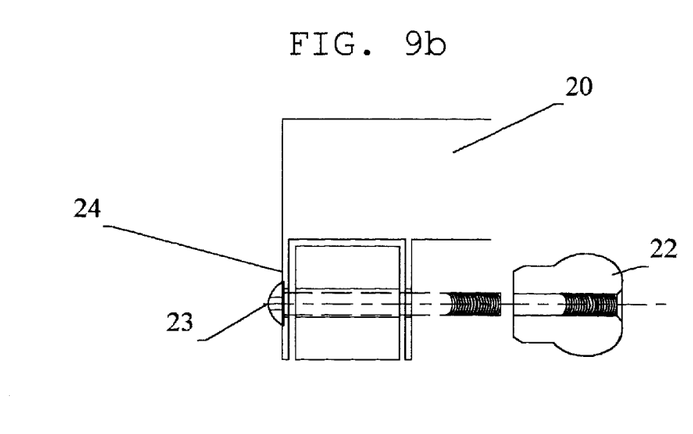
FIG. 9b is a rear elevational view of the base member, cross member and retaining bolt of FIG. 9a, with the retaining bolt positioned through the base member and cross member.
Figure 9C:
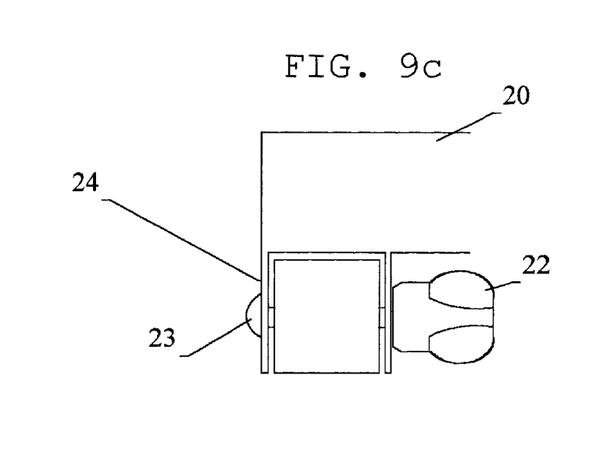
FIG. 9c is a rear elevational view of the base member, cross member and retaining bolt of FIG. 9b with a hand-tightened nut secured to the retaining bolt.
Figure 10A:
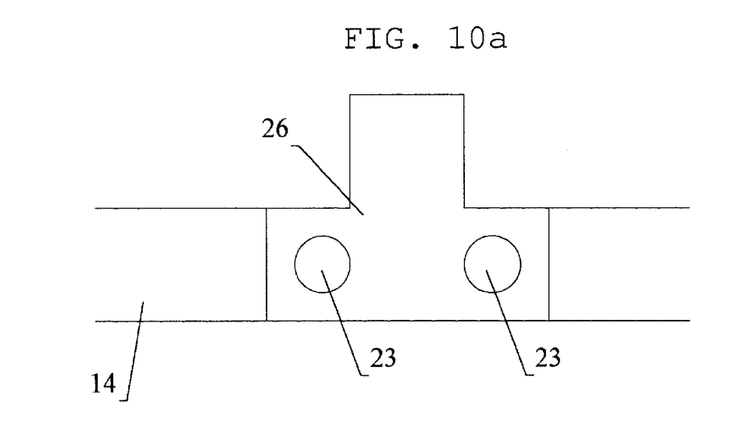
FIG. 10a is a side view of a cross member of the present invention having an attachment flange secured to the base member of the present invention by two retaining bolts.
Figure 10B:
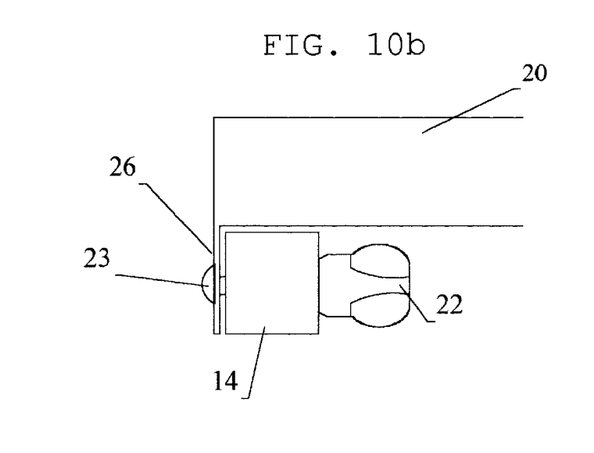
Figure 10C:
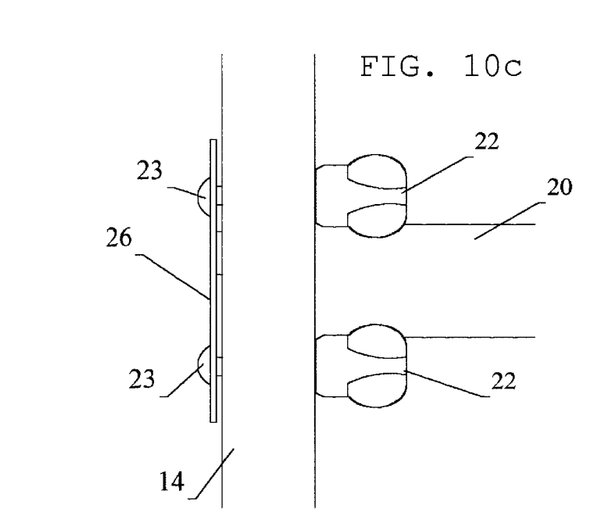
Figure 10D:
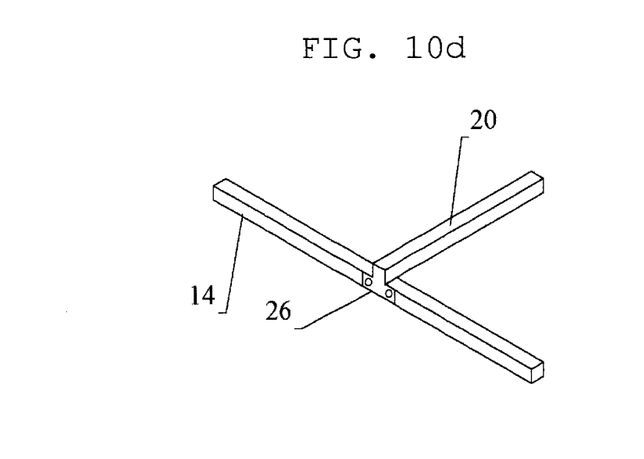
Figure 11A:
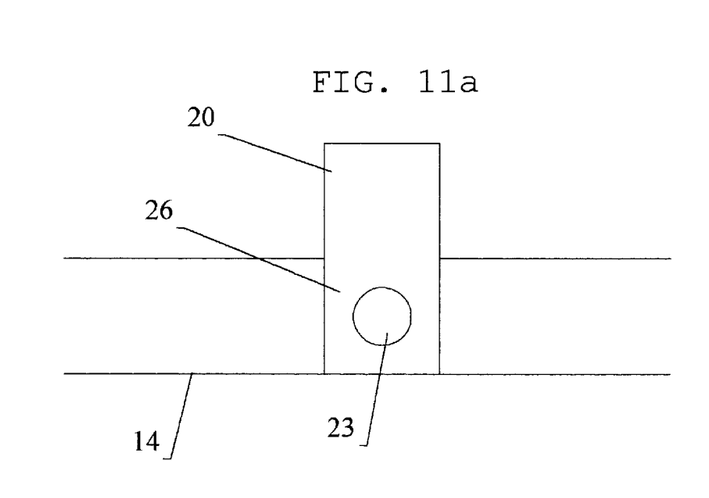
FIG. 11a is a side view of a cross member of the present invention having an attachment flange secured to the base member of the present invention by a retaining bolt.
Figure 11B:
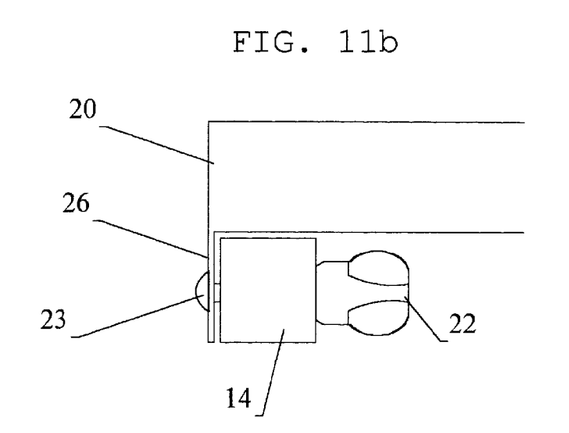
FIG. 11b is a rear elevational view of FIG. 11a showing a hand-tightened nut secured to the retaining bolt positioned through the cross member and longitudinal arm of the present invention.
Figure 11C:
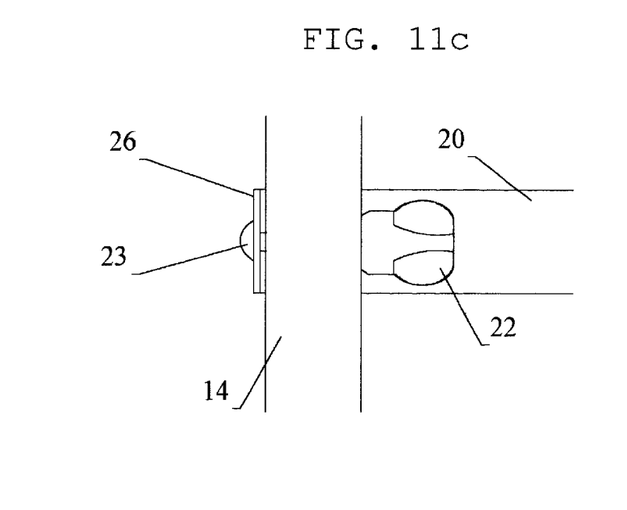
Figure 11D:
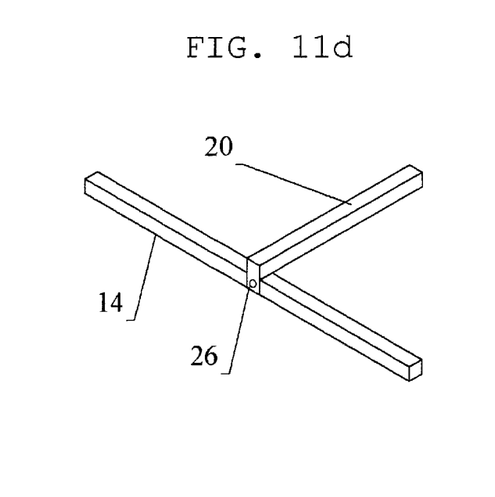
Figure 12A:
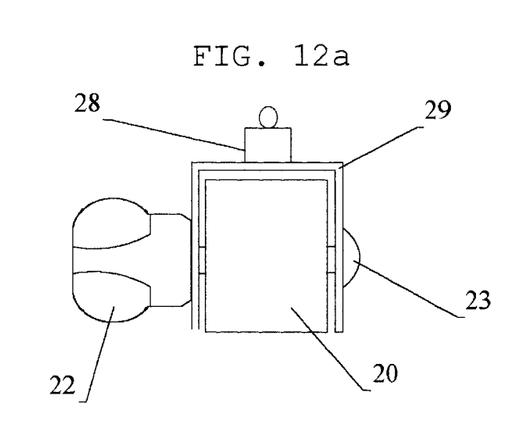
FIG. 12a is a side elevational view of an equipment mount attached to a cross member of the present invention with two retaining bolts and hand-tightened nuts.
Figure 12B:
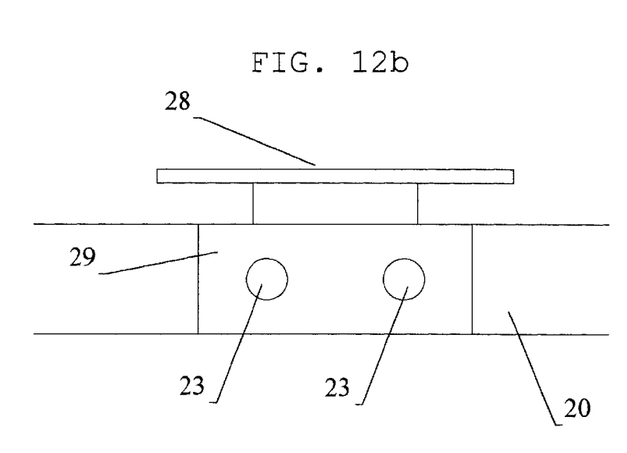
Figure 12C:
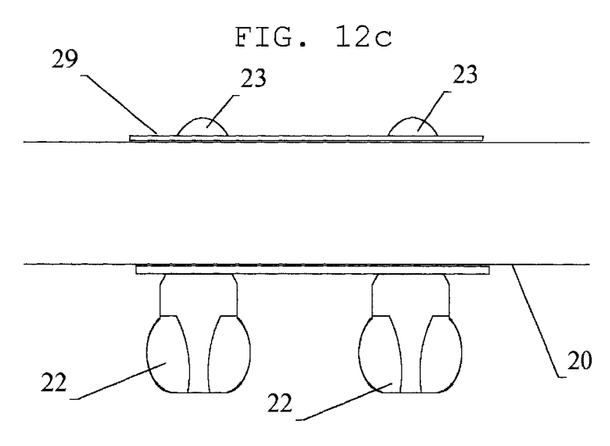
Figure 12D:
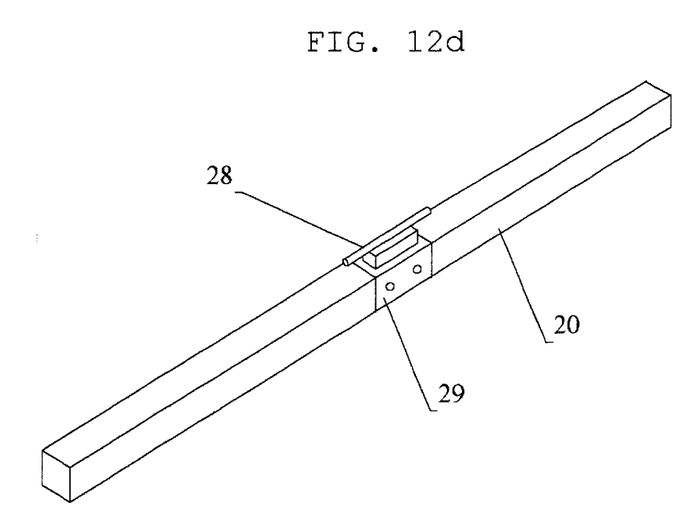
Figure 13A:
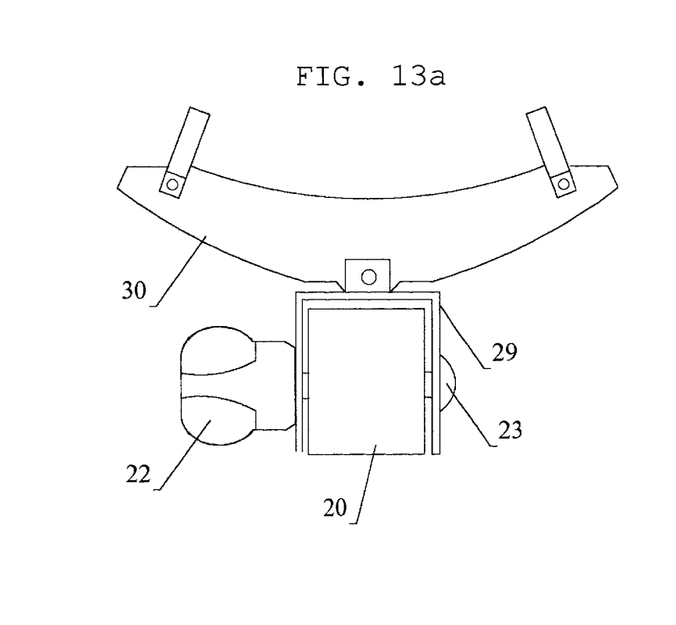
FIG. 13a is a side elevational view of a bicycle wheel mount attached to a cross member of the present invention with two retaining bolts and hand-tightened nuts.
Figure 13B:
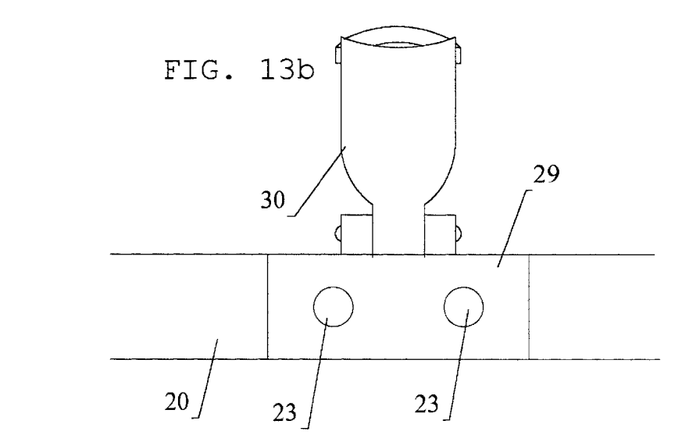
Figure 13C:
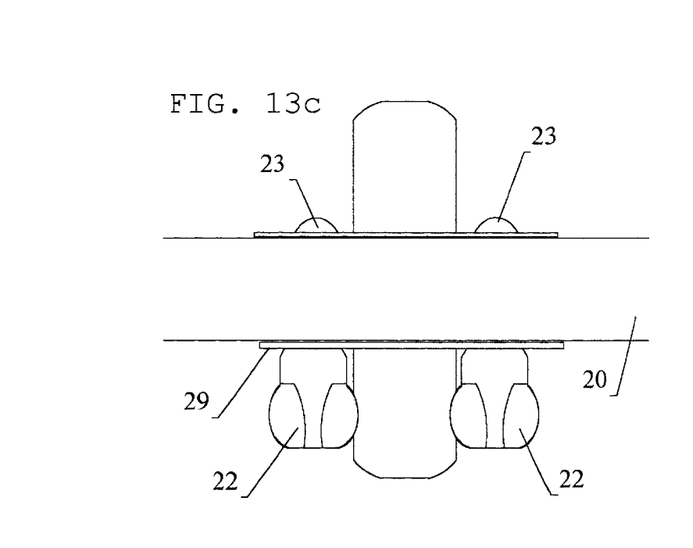
Figure 14:
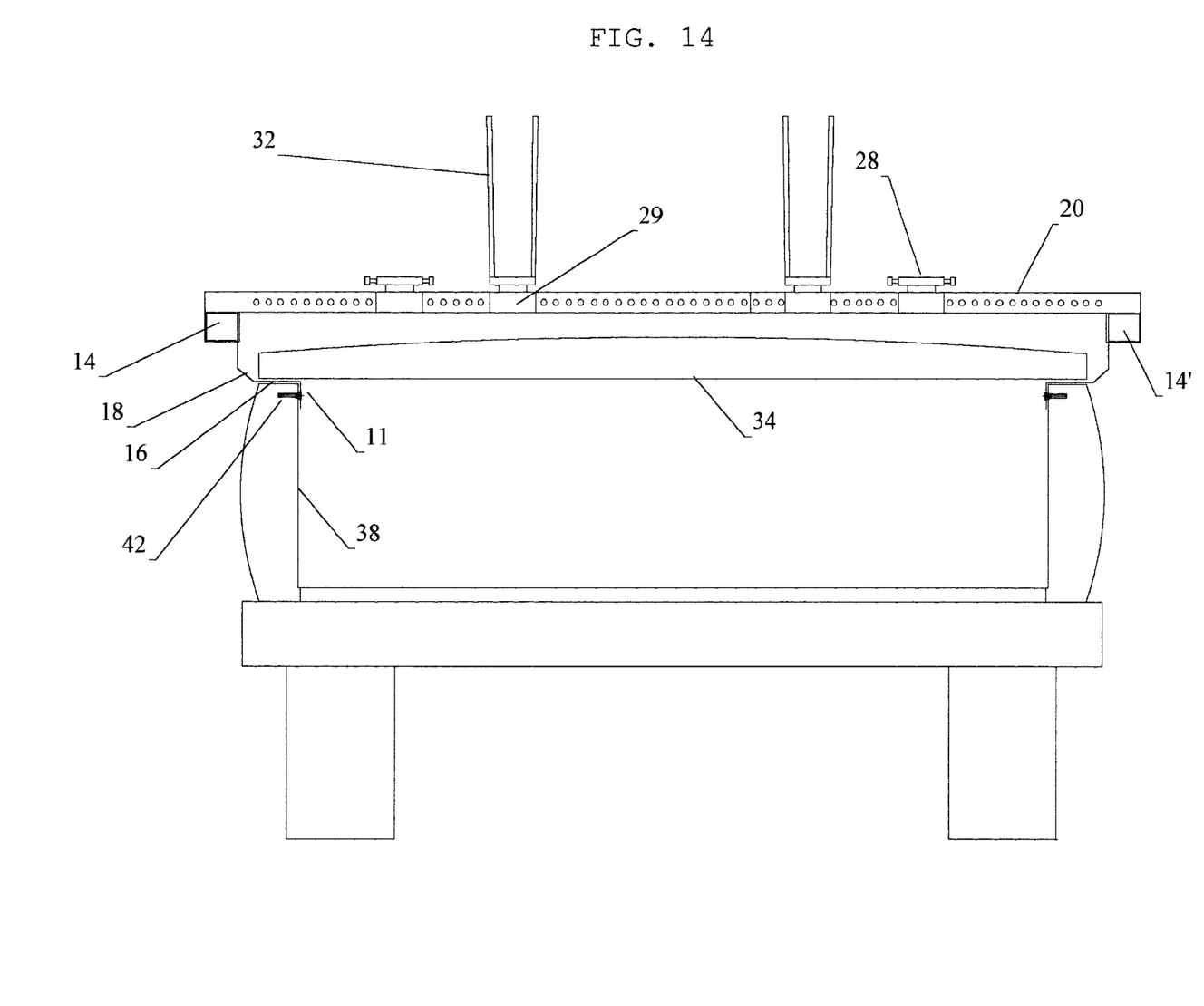
FIG. 14 is a rear elevational view of the carrying rack of the present invention having bicycle fork mounts and wheel mounts attached to the cross members.
Figure 15:
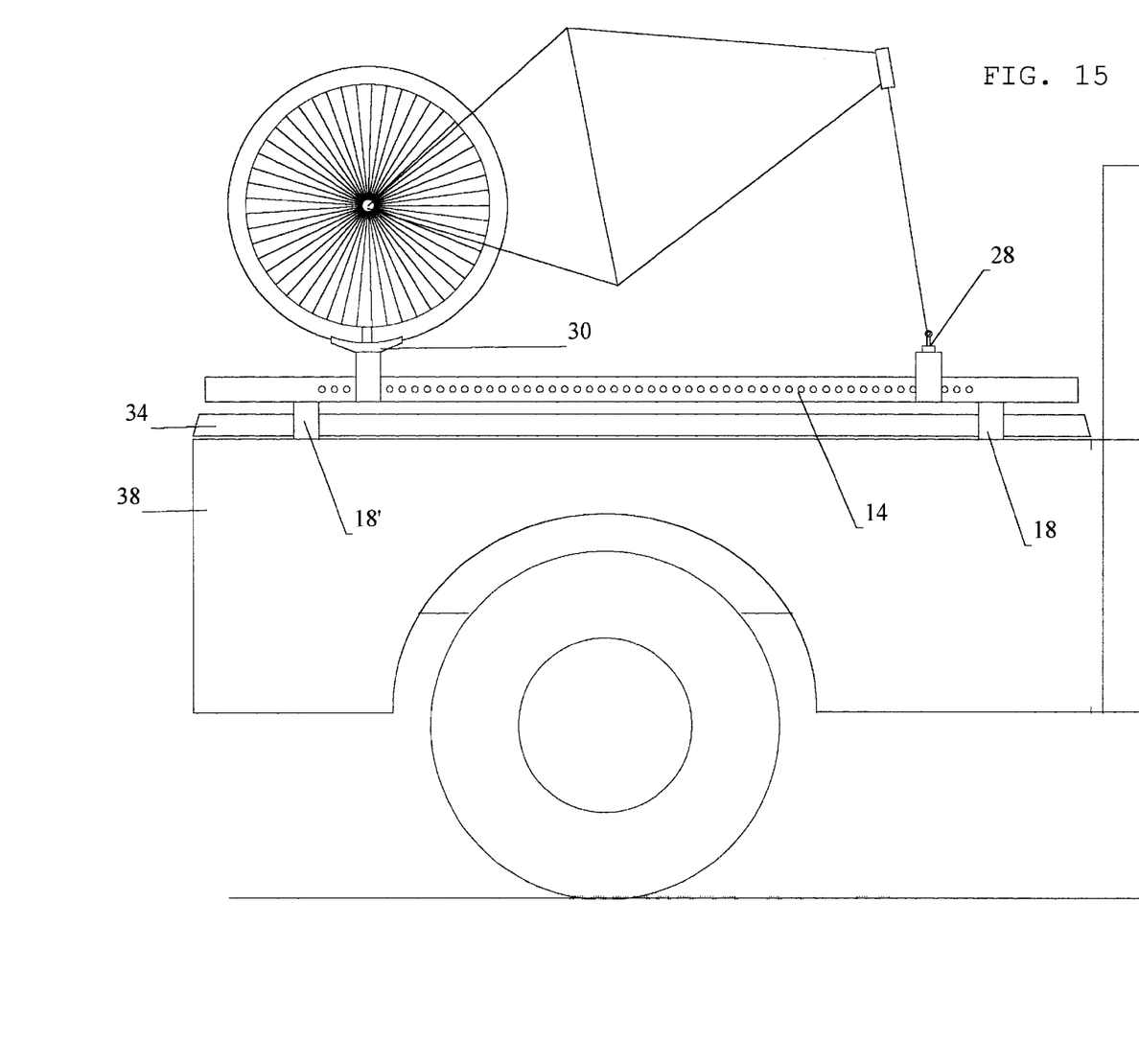
FIG. 15 is a side elevational view of the carrying rack of the present invention with a bicycle secured to a bicycle fork mount and bicycle wheel mount.
Figure 16:
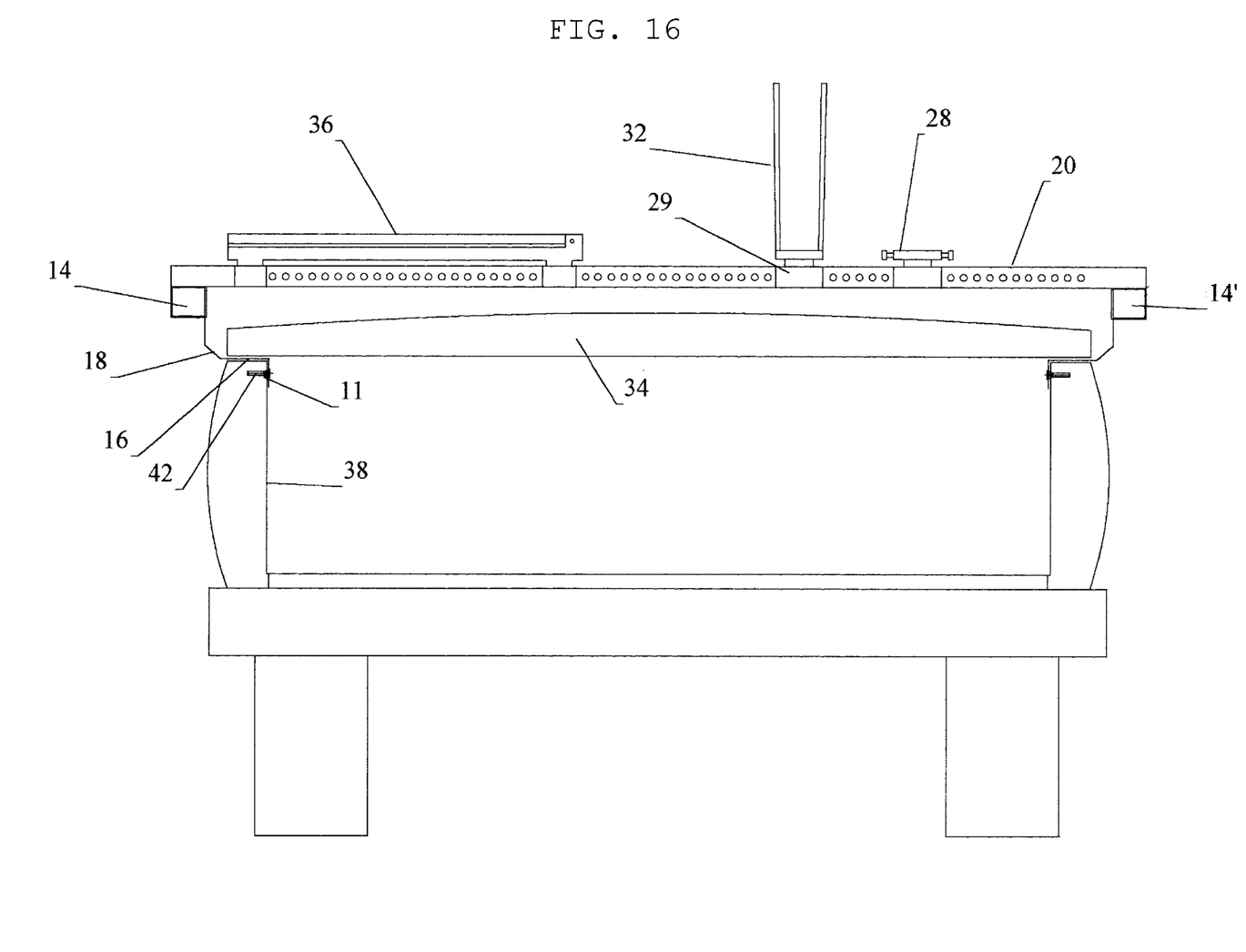
FIG. 16 is a rear elevational view of the carrying rack of the present invention having a bicycle wheel mount and fork mount attached to the cross member on one side of the carrying rack and ski securing mounts attached to the cross members on the opposite side of the carrying rack.
Figure 17:
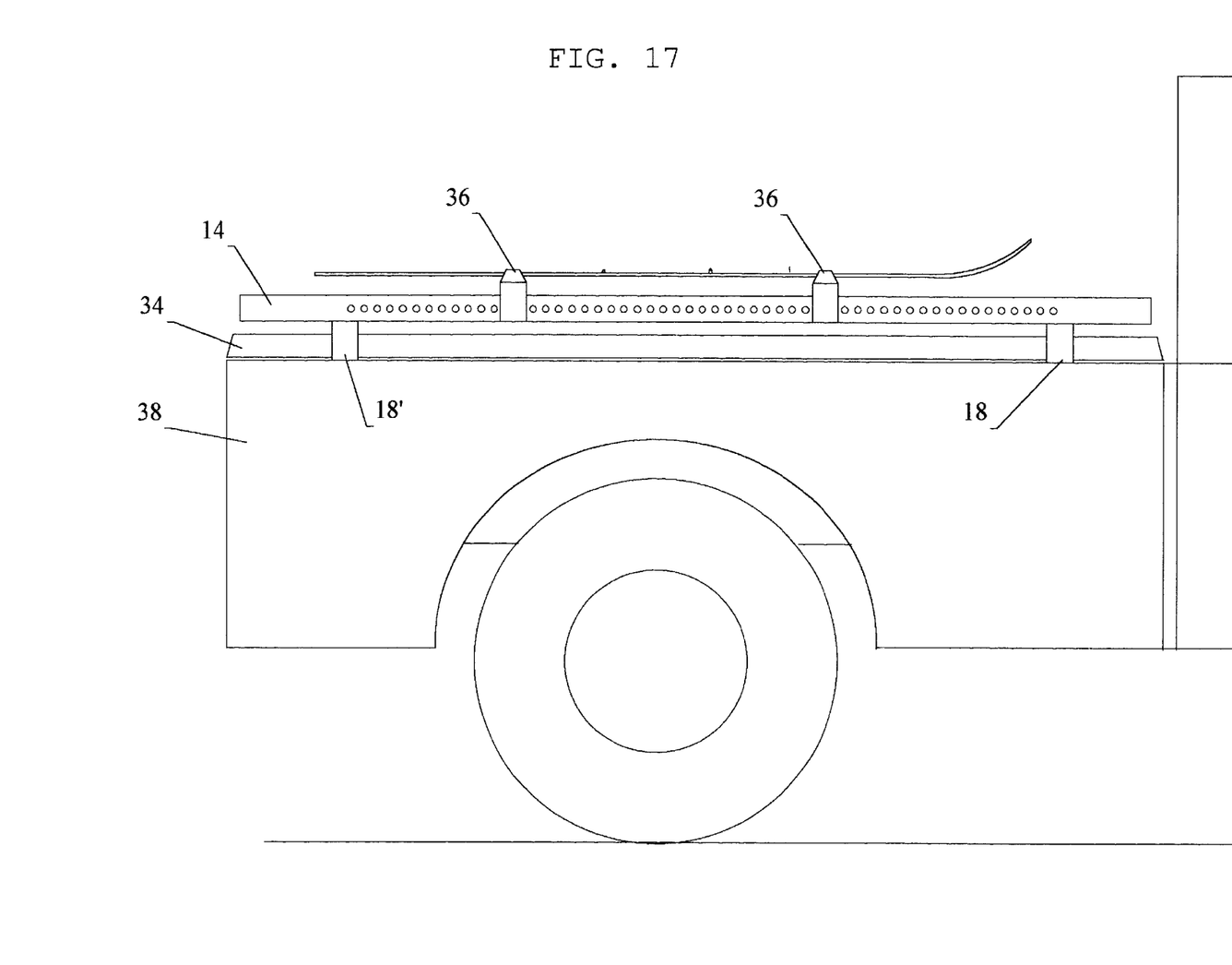
FIG. 17 is a side elevational view of the carrying rack of the present invention having ski securing mounts attached to the cross members.

As shown in FIGS. 9a through 11d, cross members 20 and 20' are attached to each longitudinal arm 14 by way of either a flange 26 or bracket 24 attached to the ends of cross members 20 and 20'. As shown in FIGS. 9a through 9c, attached to the ends of cross members 20 and 20' is attachment bracket 24 which fits around longitudinal arm 14. Cross members 20 and 20' are attached at the desired position(s) along longitudinal arm 14 by retaining bolt 23 positioned through attachment bracket 24 and longitudinal arm 14 and secured by hand-tightened nut 22. Alternatively, as shown in FIGS. 10a through 11c, cross members 20 and 20' can be affixed to each longitudinal arm 14 by a flange 26 attached at each end of cross members 20 and 20'. Similar to the operation of attachment bracket 24, cross members 20 and 20' having a flange 26 at each end are affixed to each longitudinal arm 14 by retaining bolt 23 and hand-tightened nut 22. Use of the retaining bolt 23 and hand-tightened nut 22 allows for quick and easy positioning and retention of cross members 20 and 20' at various locations along each longitudinal arm 14. As necessary, cross members 20 and 20' can be attached to longitudinal arms 14 and 14' by either one or two retaining bolts as is also shown in FIGS. 9a through 11d.

As shown in FIGS. 12a through 17, there are several styles of equipment mounts attached to each cross member 20 and 20' to secure equipment such as bicycle forks, bicycle wheels, skis, kayaks, canoes, ladders and other sporting or work equipment as is desired. These mounts include an attachment bracket 29 for attaching each equipment mount to cross members 20 and 20'. The equipment mounts are secured to cross members 20 and 20' by a retaining bolt 23 placed through the equipment mount attachment bracket 29 and through cross member 20 or 20' respectively, and retained by tightening hand-tightened nut 22 onto retaining bolt 23. These equipment mounts are known in the art and are readily available in the retail market.

As shown in FIGS. 3 through 7, to install the carrying rack of the present invention a minimal number of holes are drilled in the pickup truck bed 38 to mount the mounting member 11 of base member 12 to the truck. Alternatively, each base member 12 is secured to the pickup truck bed 38 by clamps positioned along mounting member 11 of base member 12. Once base members 12, 12' are mounted, a bed cover 34 may be installed according to its own directions. Installation of the bed cover is not affected because the bed-lip sealing member 16 adds only minimal height to the rim of the truck bed. For this reason, the hardware of the bed cover 34 simply rests on the flat surface of the bed-lip sealing member 16 as if it were the upper lip 40 of truck bed 38.

To transport equipment, cross member 20 is placed between longitudinal arms 14 and 14'. Cross member 20 is then adjusted to the correct length. Once cross member 20 is placed between both longitudinal arms 14, 14', the user secures cross member 20, 20' to longitudinal arms 14, 14' by positioning a retaining bolt 23 through the aligned apertures of longitudinal arm 14 and the attachment bracket 24, or attachment flange 26 of cross member 20. The process is repeated with cross member 20' in normal situations such as transporting bicycles. Because of the plurality of apertures formed in longitudinal arms 14 and 14', cross members 20 and 20' can be positioned at various locations along longitudinal arms 14, 14'. The equipment is then secured to equipment mounts 17, which are modularly attached to the cross members 20 and 20'.

The rack of the present invention can be manufactured from a variety of materials known in the art to provide strength and durability while being relatively light in weight. Such materials include, but are not limited to steel, metal alloys, aluminum, and polymeric composites.

Although the principles, preferred embodiments and preferred operation of the present invention have been described in detail herein, this is not to be construed as being limited to the particular illustrative forms disclosed. It will thus become apparent to those skilled in the art that various modifications of the preferred embodiments herein can be made without departing from the spirit or scope of the invention as defined by the appended claims.

What is claimed:

1. A carrying rack for a truck bed having upstanding lateral side walls comprising:
    first and second longitudinal arms extending along a substantial length of said truck bed;
    first and second bed-lip sealing members which are configured for attachment to the truck bed lateral side;
    a plurality of extension arms associated with each of said longitudinal arms and bed-lip sealing members, each extension arm being attached at a first end to one of the longitudinal arms, and at a second end to one of said bed-lip sealing members in a manner so as to secure each said longitudinal arm outboard of and at a spaced apart distance above said lateral side walls;
    means for attaching each of said bed-lip sealing members to the truck bed lateral side;
    at least one cross member releasably attached between said longitudinal arms; and,
    at least one equipment mount releasably attached to said at least one cross member.

2. An apparatus as recited in claim 1, wherein said longitudinal arms further include a plurality of apertures along the length of said longitudinal arms for selective placement and attachment of said at least one equipment mount.

3. An apparatus as recited in claim 1, wherein said at least one cross member includes a plurality of apertures for selective placement and attachment of said at least one equipment mount.

4. An apparatus as recited in claim 1, wherein said carrying rack is attached to said truck bed by a plurality fasteners.

5. An apparatus as recited in claim 1, wherein said carrying rack is attached to said truck bed by means of a plurality of clamps.

6. An apparatus as recited in claim 1, wherein said carrying rack further comprises at least one mounting bracket attached to said bed-lip sealing member, for attachment of said carrying rack to said truck bed.

7. An apparatus as recited in claim 6, wherein said carrying rack is attached to said truck bed by fasteners positioned through said at least one mounting bracket and into said truck bed.

8. An apparatus as recited in claim 1, wherein each of said pair of base members further comprise a mounting member.

9. A method of securing equipment to a carrying rack for transportation comprising:
    Attaching a base member to a respective side of a truck bed, each of said base members having a mounting member adjacent to a bed-lip sealing member, a longitudinal arm, and at least two extension arms attached at a first end to said bed-lip sealing member and at a second end to said longitudinal arm in a manner so as to secure said longitudinal arm outboard of and at a spaced apart distance above the sidewalls of the truck bed;
    selectively attaching at least one cross member to said longitudinal arms of said base members;
    selectively attaching at least one equipment mount to each of said at least one cross member; and,
    securing said equipment to said at least one equipment mount.

10. A carrying rack for a truck bed comprising:
    a base member attached to each side of a said truck bed, said base member having a mounting member adjacent to a bed-lip sealing member, at least two extension arms attached to said bed-lip sealing member, said extension arms extending outwardly then upwardly, and a longitudinal arm attached to said at least two extension arms, said longitudinal arm having a plurality of apertures formed along its length;

at least two cross members releaseably attached to said longitudinal arm of each of said base members, said at least two cross members having a plurality of apertures formed along the length of each cross member, said at least two cross member further having a bracket attached at each end of each of said cross member, said bracket having at least one aperture for accepting a fastener; and, at least one equipment mount releaseably attached to each of said at least two cross members, said at least one equipment mount having a bracket integrally attached to said equipment mount for securing said equipment mount to said at least two cross members, said bracket having at least one aperture formed in it.

11. A carrying rack for a truck bed comprising:

a base member attached to each side of said truck bed, said base member having a mounting member adjacent to a bed-lip sealing member, at least two extension arms attached to said bed-lip sealing member, said extension arms extending outwardly then upwardly, and a longitudinal arm attached to said at least two extension arms, said longitudinal arm having a plurality of apertures formed along its length;

at least two cross members releaseably attached to said longitudinal arm of each of said base members, said at least two cross members having a plurality of apertures formed along the length of each cross member, said at least two cross members further having a flange attached at each end of each of said at least two cross members, said flange having at least one aperture for accepting a fastener; and, at least one equipment mount releaseably attached to each of said at least two cross members, said at least one equipment mount having a bracket integrally attached to said equipment mount for securing said equipment mount to said at least two cross members, said bracket having at least one aperture formed in it.

12. A carrying rack for a track bed having upstanding lateral side walls comprising:

first and second longitudinal arms extending along a substantial length of said truck bed;

at least two extension arms associated with each of said longitudinal arms, each extension arm being attached at a first end to one of said longitudinal arms, and at a second end to a lateral side wall of said truck bed in a manner so as to secure said longitudinal arms outboard of and at a spaced apart distance above said lateral side walls;

means for attaching each of said extension arms to said truck bed lateral side;

at least one cross member releasably attached between said longitudinal arms; and, at least one equipment mount releasably attached to said at least one cross member.

13. An apparatus as recited in claim 12, wherein said longitudinal arms further include a plurality of apertures along the length of said longitudinal arm for selective placement and attachment of said at least one cross member.

14. An apparatus as recited in claim 12, wherein said at least one cross member includes a plurality of apertures for selective placement and attachment of said at least one equipment mount.

15. An apparatus as recited in claim 12, wherein said carrying rack is attached to the truck bed by a plurality of fasteners.

16. An apparatus as recited in claim 12, wherein said carrying rack is attached to the truck bed by means of a plurality of clamps.

* * * * *